United States Patent [19]

Tscheulin et al.

[11] Patent Number: 4,481,512
[45] Date of Patent: Nov. 6, 1984

[54] THEFT-RESISTANT AUDIO SYSTEM FOR VEHICLE

[75] Inventors: Fred L. Tscheulin, Scottsburg, Ind.; Donald R. Tilley, Jeffersontown, Ky.; Steven K. Schubert; William G. Skyllingstad, both of Louisville, Ky.

[73] Assignee: Audio Systems, Inc., Louisville, Ky.

[21] Appl. No.: 454,467

[22] Filed: Dec. 29, 1982

[51] Int. Cl.³ .............................................. H04Q 9/00
[52] U.S. Cl. ........................... 340/825.25; 340/815.1; 340/815.13; 455/346; 455/349
[58] Field of Search ........... 340/825.25, 815.1, 815.13, 340/815.14; 455/346, 348, 349

[56] References Cited

U.S. PATENT DOCUMENTS

| | | |
|---|---|---|
| 1,709,089 | 4/1929 | Nash et al. . |
| 2,731,555 | 1/1956 | Beck . |
| 2,947,914 | 8/1960 | Simons . |
| 2,973,431 | 2/1961 | Sontheimer . |
| 3,059,184 | 10/1962 | Germain . |
| 3,090,919 | 5/1963 | Tateishi . |
| 3,091,736 | 5/1963 | Germain . |
| 3,253,275 | 5/1966 | Ast ..................................... 340/815.1 |
| 3,984,161 | 10/1976 | Johnson . |
| 4,070,628 | 1/1978 | Funabashi . |
| 4,081,751 | 3/1978 | Maddaloni . |
| 4,124,815 | 11/1978 | Stoschek . |
| 4,131,851 | 12/1978 | Martiny et al. . |
| 4,134,070 | 1/1979 | Henderson et al. . |
| 4,135,158 | 1/1979 | Parmet . |
| 4,211,976 | 7/1980 | Inoue . |
| 4,231,115 | 10/1980 | Henderson et al. . |
| 4,271,408 | 6/1981 | Teshima et al. ............. 340/815.1 X |
| 4,276,654 | 6/1981 | Nations et al. . |
| 4,310,870 | 1/1982 | Kia et al. . |
| 4,357,710 | 11/1982 | Kramer et al. ................. 455/348 X |
| 4,413,260 | 11/1983 | Sieger et al. .................... 340/825.25 |

Primary Examiner—David L. Trafton
Attorney, Agent, or Firm—Wood, Herron & Evans

[57] ABSTRACT

A theft-resistant audio system for a vehicle including a housing or chassis enclosing a digitally-controlled audio signal source and microprocessor-based controller therefor which is securely and permanently mounted to the vehicle behind the dashboard, and a user interface unit containing manual input controls and an audio system status display which is pluggable into the front of the permanently secured housing through an opening in the dashboard to facilitate removal thereof when the vehicle is unattended to thereby render the audio system unusable and hence of little value to a potential thief.

13 Claims, 6 Drawing Figures

THEFT-RESISTANT AUDIO SYSTEM FOR VEHICLE

This invention relates to audio sound systems and more particularly to radio and tape decks for cars and other vehicles.

The problem of theft of audio systems from all types of vehicles is aggravating and expensive. As these systems progress in sophistication and expense, they become even more attractive to thieves. This problem affects not only individual owners of vehicles in which such audio systems are installed, but can affect to an even larger extent vehicle manufacturers and distributors who install such systems. Vehicles sitting in shipping yards, at docks, and in transit are particularly susceptible to theft of "factory installed" audio systems.

It is well known that most vehicles, even though locked, can be forcibly entered relatively easily and quickly. Once entered, a few deft crowbar operations can quickly remove a radio chassis, perhaps expensively damaging a vehicle, not to mention the cost of the stolen equipment.

While some audio manufacturers, particularly in the C.B. radio market, have devised quick connect mounts and couplings so that the entire audio unit can be easily removed and stored in a safe place when the vehicle is unattended, this has not solved the problem. Owners often feel the bother of removal and handling of even a relatively small audio unit is too inconvenient to make it worthwhile. Moreover, such removal capability is not of much comfort to the manufacturer or distributor who cannot maintain adequate security for vehicles in transit in which factory-installed audio units are present.

Accordingly, it has been one objective of this invention to provide a "factory installed" audio system which has a significantly reduced susceptibility to theft both while the vehicle is in transit as well as after delivery to the owner. To this end, the present invention contemplates the segregation of components of an audio system in such a way that some components can be securely mounted in the vehicle on a permanent basis at the factory, and other components readily removed during vehicle transit or when unattended by the owner so that what remains in the vehicle is both difficult to remove and of no value to a thief. At the same time, the drawbacks of prior audio system removal proposals have been recognized. The present invention differs significantly from the prior art in the conceptualization of component segregation such that what is removable is, in size, very small, making it very easy to remove and handle, while leaving a substantial portion of the system securely mounted in the vehicle, but rendered valueless without the removed portion.

More particularly, the present invention, in a preferred embodiment thereof, contemplates an audio system, such as a multiple-function CB-AM-FM stereo radio with cassette deck, having a chassis or housing permanently and securely mounted to the vehicle, such as behind the dashboard, and an easily removable user interface unit which can be readily unplugged from the chassis from the front of the dashboard when the vehicle is unattended or in transit to disable the system and render what remains of it not only difficult to remove without destroying it, but relatively unattractive to a thief due to its uselessness without the user interface unit which has been removed. The chassis includes a digitally controlled audio signal source, e.g., a radio receiver and/or tape deck, and an associated microprocessor-based controller therefor, while the user interface unit contains manually activated input controls, such as, radio station and band selector switches, and a system status display for displaying such things as radio station frequency, tape direction and speed, and the like. There are no manual operating controls or system displays on the chassis, and no audio signal processing for such functions as base and treble, Dolby, etc. in the user interface unit. When the user interface unit is removed, the chassis circuitry is rendered virtually useless to anyone. This, coupled with its permanent, behind-the-dash secure mount, significantly reduces, if not completely eliminates, its susceptibility to theft.

The provision of an audio system with its components so segregated itself presents certain problems. First, it is necessary to maintain the user interface unit in as small a package as possible to encourage its removal by the owner when the vehicle is left unattended. Second, a multi-component audio system generally requires many connections for the manual input controls and system status display, which in turn necessitates a large wiring harness or connector between the separable components. Moreover, where audio signals are present, interference caused by the connectors, displays, manual controls, etc. must be dealt with.

Accordingly, it is desirable to provide a user interface unit, which is pluggable into the chassis of the audio system, and in which the manual input controls have multiple and independent functions, yet which is compact, relatively interference-free, and minimizes the number of interconnections to the chassis. In consideration of the foregoing, a preferred embodiment of the invention contemplates providing the removable user interface unit with a plurality of manually-actuated dual position switches, such as radio station and band selectors, which are associated with different points of a matrix defined by two groups of intersecting conductors. The matrix conductors are connectable to the chassis and when so connected are scanned by the microprocessor-based controller to facilitate control of the chassis from manual switch inputs to the user interface unit. Since the matrix conductors are far less in number than the number of manual input switches, fewer connections are required between the chassis and user interface unit. In accordance with a further feature of the preferred embodiment, the system status displays incorporated in the user interface unit are connected to the microprocessor-based controller via a serial data bus, further reducing the number of connections required to the user interface unit. A still further aspect of the preferred embodiment inheres in isolating the audio output of the chassis and d.c. input/output of the user interface unit, thereby freeing the audio signals in the chassis from interference generated by the manually-activated switches and system status display located in the user interface unit which are limited to d.c. operation.

Alternatively, the invention contemplates the use of microprocessing circuits within the user interface unit which generates serial digital data for signalling the chassis' microprocessor controller without use of a matrix between the manual switches and the chassis microprocessor-based controller. This alternative, while eliminating the matrix conductors which interconnected the chassis and user interface unit, would require two serial data links between the user interface unit and chassis.

As is apparent, the invention contemplates a user interface unit which is extremely small for the functions it performs, yet contains all the necessary manually operable switches and visual signalling means for displaying the status of the audio system. In the preferred embodiment, the user interface unit includes (from front to back) a front trim panel, a reflector board, a printed circuit board, and a rear connector board, all of which are planar and assembled in a compact sandwich arrangement. The visual display means, in a preferred form, includes light-emitting diodes fabricated integrally with the printed circuit board, and tunnels in the reflector board, which is located between the front trim panel and printed circuit board, in register with the diodes for transmission of light to illuminate, from the rear, light-penetrable indicia on the trim panel which indicate the status of the system. The switches, which are located in bores in the reflector panel, include terminals for selectively bridging conductors formed on the printed circuit board when a switch plunger, which extends through an access opening in the trim panel, is depressed and urges its associated conductive element into contact with the matrix conductors formed on the circuit board. The connector board, which is disposed behind the printed circuit board, includes conductors joining the components on that board, in preselected circuits, to a male plug means projecting from the rear side of the connector board. The plug is insertable into the chassis behind the dashboard as the user interface unit is pushed toward the dashboard to electrically couple the user interface unit to the chassis components.

By the foregoing means, the user interface unit can be made very small, and the entire audio signal circuitry can be retained in the permanently and securely mounted chassis, but rendered useless by removal of the user interface unit which can easily be slipped into a pocket or stored in a safe place when the vehicle is not in use, thus rendering the chassis unattractive from a theft standpoint.

These and other features, objectives, and advantages of the invention will become more readily apparent from a detailed description thereof taken in connection with the drawings in which.

Figure 1:
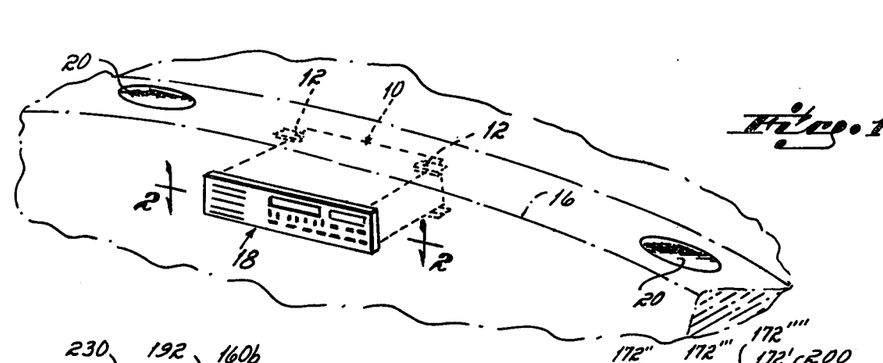
FIG. 1 is a perspective view of a preferred embodiment of the audio system of this invention showing it installed in the dashboard of a vehicle, with the installed audio system including a chassis which is securely fastened to the vehicle and a pluggable user interface unit which is readily attachable and removable from the chassis to render the audio system operative and inoperative, respectively.
Figure 2:
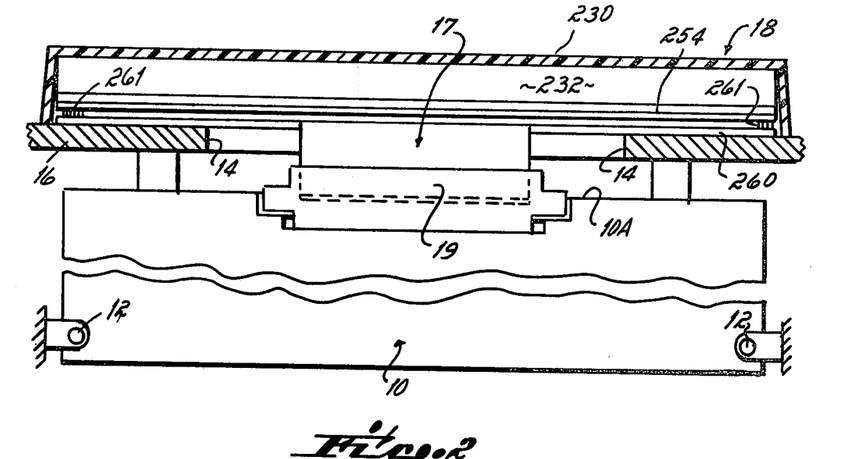
FIG. 2 is a view of the vehicle-installed audio system of FIG. 1 as seen on line 2—2.

With reference to FIGS. 1 and 2, the preferred embodiment is seen to include a chassis or housing 10, which encloses the audio frequency generating circuit components and microprocessor-based controller shown in detail in FIG. 5. The chassis 10, which may be fabricated of steel or other suitable durable material, is securely mounted to the vehicle in which the audio system is installed by suitable theft-resistant fastening means 12, such as, heavy duty threaded fasteners, rivets, weldments, or the like. The fastening means selected for securing the chassis to the vehicle, such as to the vehicle frame structure behind the dashboard 16, should be sufficiently strong to prevent removal of the chassis from the vehicle, for example, by prying it from the dashboard with a crowbar or similar tool, without seriously damaging the chassis in the process. If the fastening of the chassis 10 is such that damage thereto is a necessary incident to its removal, there is little incentive on the part of a thief to steal it. Preferably the front face 10A of chassis 10 is located behind an opening 14 in the dashboard 16. Dashboard opening 14 is smaller than the chassis face 10A to prevent removal of the chassis 10 through the opening.

The audio system also includes a detachable user interface unit 18 which is quickly and easily connected and disconnected from the front face 10A of the chassis 10 by means of a pluggable male connector 17 which extends through dashboard opening 14 into a female connector 19 in chassis wall 10A. The detachable user interface unit 18 contains manually activatable switches 150-190 (FIG. 4) for controlling the operation of the audio system, e.g., AM mode, FM mode, CB mode, tape mode, volume, etc., as well as display means 160*a/b*-190*a/b/c/d*, 160"-190"' and 200 (FIG. 4) for indicating the status of the audio system, e.g., AM mode, FM mode, CB mode, tape mode, station frequency, etc., all of which are shown in more detail in FIGS. 4 and 5. Additionally included in the audio system are one or more speakers 20 mounted at suitable locations in the vehicle. Speakers 20 are electrically connected to the output of the audio signal generating circuitry housed within the chassis 10.

With the audio system of this invention theft is deterred by two principal factors. First, and assuming the user interface unit 18 is removed from the chassis 10 by the vehicle occupant when it is unattended, there is little incentive to steal the chassis since it is of no utility without the user interface unit which has been removed. Second, since the user interface unit 18 is separable from the chassis, the interface unit can be shipped to the vehicle dealer separate from the chassis, providing little incentive to steal the chassis from the vehicle during transit. Also, because the region behind the dashboard is readily accessible during manufacture, the chassis can be installed much more securely than can conveniently be done if installed after vehicle manufacture by the dealer, further enhancing theft deterrence.

Figure 5A:
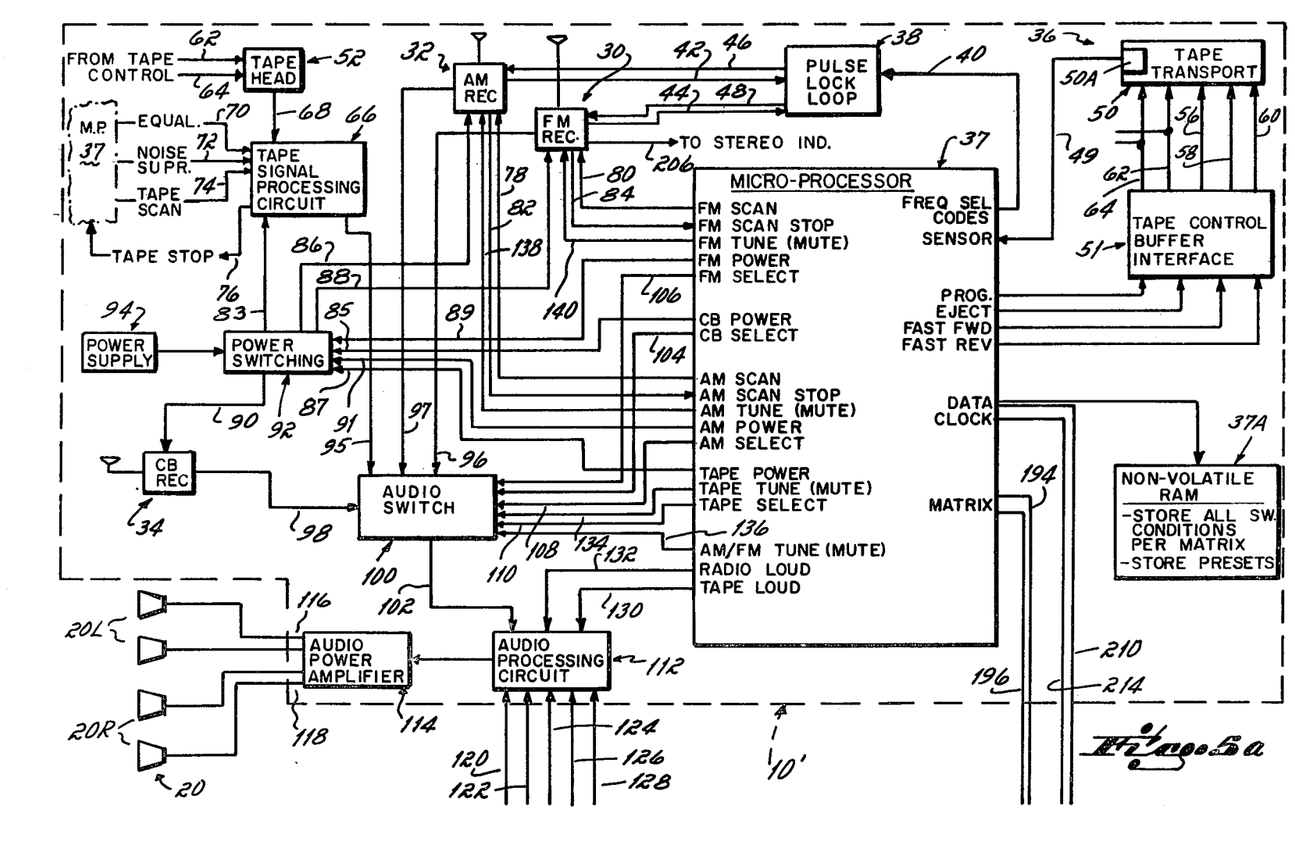
FIGS. 5A, 5B combined illustrate a schematic circuit diagram of the audio system showing the principal components of the detachable user interface unit and securely mounted chassis.
Figure 5B:
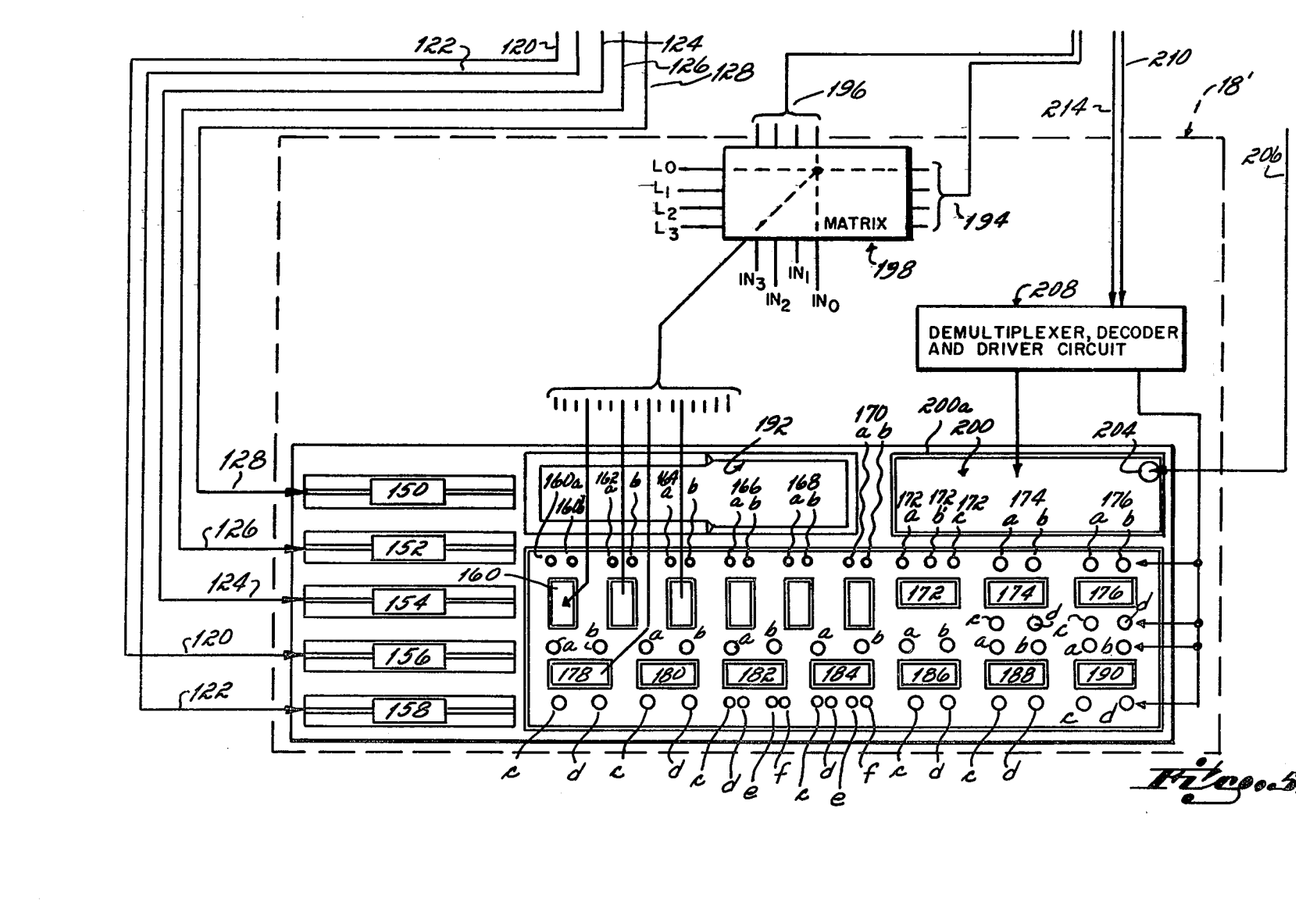

FIGS. 5A and 5B show the various components of the audio sytem. The components within the dotted line block 18' are physically located in the user interface unit 18, while the components located within the dotted line block 10' are physically located in the chassis 10. As noted previously, the speakers 20, 20 are mounted at some convenient location in the vehicle external to the chassis 10 and detachable user interface unit 18.

The chassis 10 houses a multi-component digitally-controllable audio signal source, which includes an FM receiving unit 30, an AM receiving unit 32, a citizens band receiving unit 34 and a tape unit 36, and a microprocessor-based controller 37 for controlling the audio signal source and the display 160*a/b*-190*a/b/c/d*, 160″-190‴, 200 in response to the manual switch means 160-190. Associated with the AM and FM receiving units 30 and 32 is a phase locked loop circuit 38, such as is commercially available from National Semiconductors designated Model DS8908, which facilitates tuning of the AM and FM receivers to desired stations in response to digital frequency selection codes input to the phase locked loop 38 from the controller 37 on line 40. The phase locked loop 38, in a conventional manner well known to those skilled in the art, monitors the frequency of the AM or FM local oscillator input thereto on lines 42 and 44, depending on whether the audio system is operating in the AM or FM radio mode, and compares the local oscillator frequency to the desired frequency corresponding to the coded frequency selection input on line 40. In response to any deviation between the local oscillator frequency and the desired frequency, the phase locked loop 38 produces control signals on lines 46 or 48 to the local oscillators of the AM and FM receivers, as the case may be, to adjust the local oscillator output to the desired frequency corresponding to the frequency selection code input to the phase locked loop from the controller 37 on line 40. The frequency selection codes on line 40 from the controller 37 are produced as a result of activation of switches on the user interface unit to be described.

The tape unit, which can also be of a conventional type well known in the art, includes a tape transport 50 for transporting a tape, for example, in a cassette, past a dual head transducing unit 52. The tape transport 50 includes a suitable tape ejecting mechanism operative in response to input of an eject signal on line 56 from the controller 37 via a tape control buffer interface circuit 51, and bidirectionally dual speed tape drive means for transporting the tape past the transducer 52 at fast (rewind) and slow (transducing) speeds in the forward and reverse directions when input via buffer 51 with suitable control signals from the controller 37 on lines 58, 60, 62, and 64. Buffer 51 functions to convert digital commands output from the controller 37 into suitable energization signals for solenoids in the tape transport 50 which control tape ejection, direction, and speed in a manner well known in the field. The tape transport control inputs to the tape transport 50 from the controller 37 via the buffer 51 are produced as a result of activation of suitable switches on the user interface unit 18, to be described. The normal forward and reverse signals input to the tape transport on lines 62 and 64 are also input to the dual head transducing unit 52 to select for output on line 68, on an alternative basis, signals transduced from respectively different tracks of the tape when transported in the forward and reverse directions. The tape transport 50 also includes a switch 50A which provides an output signal to the controller 37 on line 49 in response to the presence of a tape in the transport 50.

Also associated with the tape unit 36 is a tape signal processing circuit 66. The tape signal processing circuit 66, which is also conventional, includes input lines 70, 72, and 74 on which digital control signals are provided from the controller 37 to control the various functions of the tape signal processing circuit 66, to be described. The input on line 70 establishes the proper equalizaton bias which is a function of the type of tape being used, for example, chromium dioxide, metal, etc. The signal on line 72 activates the Dolby noise suppression circuit. The input on line 74 activates the tape scan function during the fast forward mode to advance the tape to the start of the next recorded music program. The signals to the tape signal processing circuit 66 on lines 70, 72, and 74 from the controller 37 are produced in response to activation of suitable switches on the user interface unit 18, to be described. The tape signal processing circuit 66 is also provided with an output line 76 on which a control signal is present when, during the tape scan mode, there is an absence of recorded material for a preset time interval, such as three seconds, indicating that a new recorded music program will shortly start, in which event the tape scan mode is terminated and the tape driven at normal speed to transduce the next recorded music program for audible reproduction by the speakers.

The AM receiver 32 and the FM receiver 30 are also provided with scan input control lines 78 and 80, respectively, and stop output lines 82 and 84 which function in much the same manner as the tape scan and tape stop lines 74 and 76 associated with the tape signal processing unit 66.

The tape signal processing circuit 66, AM receiver 32, FM receiver 30, and citizens band receiver 34 are provided with power input lines 83, 86, 88, and 90, respectively, from a power switching circuit 92 which provides power from a supply 94 to either the tape ciruit, AM receiver, FM receiver, or CB receiver, depending upon which one is selected by the user. The power switching circuit 92 is under control of the controller 37 via control lines 85, 87, 89, and 91 on which digital signals are present when the CB receiver, tape unit, FM receiver or AM receiver is selected by the user by suitable switch activation on user interface unit 18.

The tape signal processing circuit 66 and the receivers 30, 32, and 34 each have an audio signal output line 95, 96, 97, and 98, respectively. The output lines 95 and 96 from the tape signal processing circuit 66 and FM receiver 30 each consist of two separate lines corresponding to right and left stero channels. The audio signal output lines 95, 96, 97, and 98 are input to an audio switch 100 which selects for output on line 102 the desired audio signal depending upon which of the selection lines 104, 106, 108, or 110 from the controller 37 has been activated in response to manual activation of the appropriate switches on the user interface unit 18.

The selected audio signal output from the audio switch 100 on line 102 is input to an audio processing circuit 112. After suitable processing of a type to be described, the processed audio signal, which in a stero system consists of separate left and right channels, is input to a multi-channel audio power amplifier 114. The amplified left and right channel auido signals are output from amplifier 114 on left and right line pairs 116 and 118 to left and right pairs of front and rear speakers 20L and 20R.

The audio processing circuit 112 is provided with an input on line 120 to control the base, an input on line 122 to control the volume, an input on line 124 to control the treble, an input on line 126 to control the balance between the left and right speakers, and an input on line 128 to control the balance between the front and rear speakers. The audio processing circuit 112 is also provided with tape and radio "loudness" control signals on line 130 and 132 which cause the audio processing circuit 112 to selectively enhance, under low volume conditions, high frequency and low frequency components of tape and radio audio signals, respectively, in accordance with the well known Fletcher-Munson audio processing technique. The control signals input to the audio processing circuit 112 are provided directly from switches, to be described, located on the user interface unit 18.

To minimize the output of audible noise from the speakers 20 when turning the power ON and OFF, switching stations, scanning, changing tape transport functions, and the like, muting control signals are provided. More specifically, a tape mute signal is provided on line 134 to the audio switch 100 to mute audio signals output form the tape during scan, fast forward, fast reverse, eject, etc. when the tape unit 36 is in use. Similarly, an AM-FM tune mute signal is provided on line 136 to the audio switch 100, along with separate AM and FM tune mute signals on lines 138 and 140, to the AM and FM receivers 32 and 30 which inhibit the audible reproduction of audio signals from the AM and FM receivers during station switching, and the like. The tune mute signals are provided by the controller 37 as an incident to station switching, etc. in response to activation of various functions switches on the user interface unit 18, to be described.

To provide for manual control of the various functions of the audio system, the detachable user interface unit 18 is providd with a plurality of manually activated switches, which are divided into two groups 150–158 and 160–190. The switches 150–158, which are in the form of slide potentiometers, provide analog d.c. signals of varying amplitude on input lines 120–128 to the audio processing circuit 112 to control bass, volume, trebble, balance, and fade. Switches 160–190 are each dual-position switches which fuction as an open circuit connection or a short circuit connection depending upon the position to which the respective switch has been manually activated. Associated with the switches 160–190 are a plurality of electrical conductors arranged into two groups 194 and 196 to define a matrix 198. Each of the switches 160–190 is associated with a different matrix point of the matrix 198, and depending upon which one of the two positions a particular dual position switch is in, the two intersecting conductors, one conductor from each of the groups 194 and 196, defining the matrix point associated with the switch in question will be either electrically connected or electrically disconnected. For example, if dual position switch 160 is associated with intersecting conductors $L_0$ and $IN_0$, depending upon which one of the two positions the switch 160 is in, the associated intersecting conductors will be either electrically connected or electrically disconnected. More specifically, if switch 160 is depressed, its associated intersecting conductors $L_0$ and $IN_0$ are connected; when switch 160 is released, conductors $L_0$ and $IN_0$ are disconnected.

When the audio system is in the radio mode, which is normally the case unless a cassette has been inserted into the tape transport via the opening 192 and the cassette-sensing switch 50A activated, the AM band, the FM band, or the citizen band is selected by sequentially activating the dual position switch 172 until the desired band is selected. The frequency to which the AM or FM receiver 30 or 32, respectively, is tuned will be displayed in the digital display 200. Similarly, when the CB channel is selected, the number "19" is displayed in the digital display 200.

If it is desired to select the next adjacent station which is broadcasting, of either higher or lower frequency, the seek switch 182 is activated in conjunction with either the up switch 180 or the down switch 178. The phase locked loop 38 will then output to the appropriate AM or FM receiver suitable control signals to select the next highest or lowest frequency. If it is broadcasting on that station, the AM or FM receiver will provide a stop signal to the controller 37 on its output line 82 or 84, as the case may be, and no further frequency selection codes will be output from the controller to the phase locked loop 38. If the next adjacent station is not broadcasting, the controller outputs to the phase locked loop the code of the next higher or lower station, depending on whether the system is "seeking up" or "seeking down". This process continues until a station to which the AM or FM receiver is tuned is broadcasting, in which event the stop signal is output and further tuning terminated.

If it is desired to preset the particular frequency to which either the AM or FM receiver is tuned, the memory set switch 186 is activated along with one of the station preset switches 160–170. When this is done, the frequency is stored in a nonvolatile random access memory 37A associated with the controller 37. When a preset switch is subsequently activated, the controller will retrieve from memory the frequency stored for the activated preset switch and issue an appropriate frequency code to the phase locked loop 38 on line 40. The AM or FM receiver, depending on which recevier has been selected by the switch 172, will then tune, under control of the phase locked loop, the selected receiver to the station corresponding to the station preset switch 160–170 which has been activated.

If in the radio mode it is desired to scan up or down either the AM or FM frequency band, the scan switch 184 is activated in combination with either the up or down switch 180 or 178. Depending upon which receiver is activated by the AM/FM selection switch 172, the appropriate receiver will tune successively up or down, as the case may be, under control of the phase loop in response to commands issued by the controller on line 40, stopping for a preset time at each station, for example, seven seconds. During the seven-second interval that the AM or FM tuner is stopped at a particular frequency, the user can decide whether the program material is satisfactory. If it is, the scan switch 184 is again activated and the receiver remains tuned to that station.

If it is desired to change the station to the next higher station, whether or not anything is currently being broadcast on that station, the dual position switch 176 is activated. In response thereto, the controller will issue the appropriate frequency code to the phase locked loop 38 on line 40, which will in turn control the local oscillator of the appropriate receiver to tune to the next highest frequency station.

If enhancement of high and low frequencies at low volume is desired during the radio mode or the tape mode, the loudness switch 174 is activated. Similarly, if Dolby audio signal processing is desired during either the FM or tape mode of operation, the Dolby switch 188 is activated, causing the controller to issue the appropriate command to the audio processing circuit 112 on either line 130 or 132, as the case may be.

The audio system is placed in the power ON or the power OFF condition under control of the switch 190. During the tape mode, if a chromium dioxide tape is used, switch 176 is activated, causing controller 37 to issue the appropriate command on line 70 to the tape signal processing circuit 66. Activation of switch 186 in the tape mode places the tape unit in the tape scan mode, while activation of switch 178 causes the tape transport to switch between its forward and reverse directions and a different one of the two tape heads of the tape transducing unit 52 to be selected corresponding to one or the other of the two tracks recorded on the tape. Activation of the eject switch 180 during the tape mode ejects the cassette from the tape transport 50, causing it to project through the opening 192 in the user interface unit 18 for removal by the user.

Figure 4:
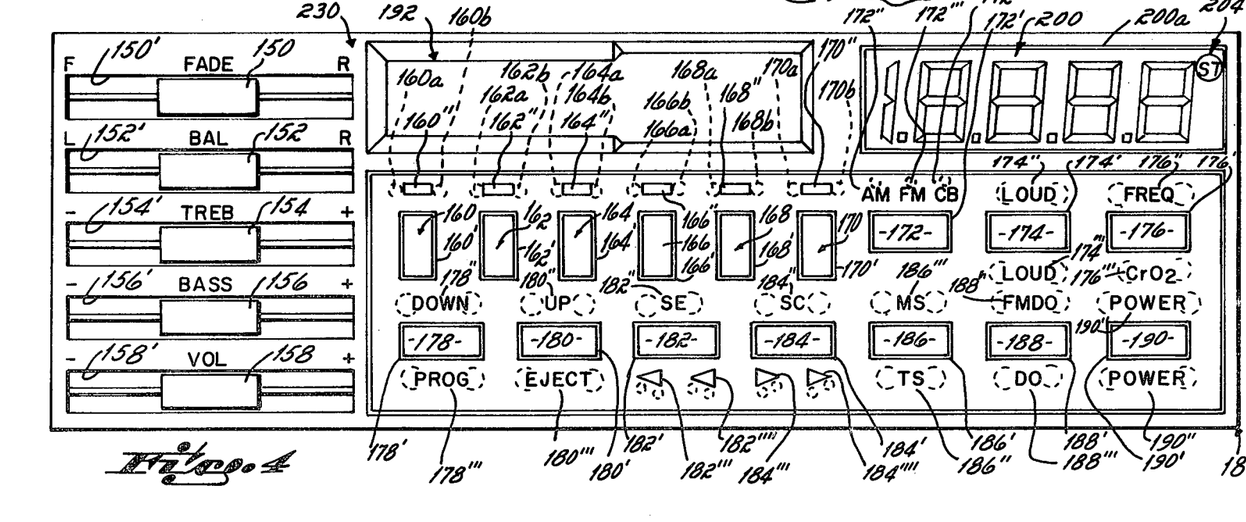
FIG. 4 is a front elevational view of the user interface unit showing the orientation of the manually actuatable switches and display for indicating the status of the audio system.

The detachable user interface unit 18 is provided with a plurality of visual indicators, preferably in the form of light-emitting diodes, to indicate the status of the audio system. For example, associated with each of the six station preset switches 160–170 are separate red and green light-emitting diodes 160a and 160b, 162a and 162b, 164a and 164b, 166a and 166b, 168a and 168b, and 170a and 170b. When a station preset switch 160–170 has been activated during the radio mode, its associated green light-emitting diode is illuminated. Assuming the system is in the radio mode, the red light-emitting diode associated with the station preset switches 160–170 will be in their light-emitting condition when their preset function is deactivated.

Associated with CB/AM/FM selector switch 172 are three green light-emitting diodes 172a, 172b, and 172c. When a particular band is selected, its associated light-emitting diode is energized to illuminate the associated AM, FM, or CB indicia, to be described. Associated with the loudness switch 174 are upper red and green light-emitting diodes 174a and 174b which indicate the condition, deactivated or activated, of the Fletcher-Munson function when the audio system is in the radio mode. Associated with the switch 176 are upper red and green light-emitting diodes 176a and 176b which indicate, when the system is in the radio mode, whether the frequency selection function of switch 176 is deactivated or activated. Similarly, associated with each of switches 178–190 are upper red and green light-emitting diodes 178a and 178b, 180a and 180b, 182a and 182b, 184a and 184b, 186a and 186b, 188a and 188b, and 190a and 190b, which indicate during the radio mode the function status, activated or deactivated, of the down switch 178, up switch 180, seek switch 182, scan switch 184, memory set switch 186, FM Dolby switch 188, and power switch 190.

Associated with the loudness switch 174 are lower red and green light-emitting diodes 174c and 174d which indicate the status, deactivated or activated, of the Fletcher-Munson function when the system is in the tape mode. Similarly, associated with the switch 176 are lower red and green light-emitting diodes 176c and 176d which indicate, when in the tape mode, whether a normal bias or chromium dioxide bias tape has been selected. The program or track selection switch 178, eject switch 180, tape scan switch 186, tape Dolby switch 188, and power switch 190 have associated therewith lower sets of red and green light-emitting diodes 178c and 178d, 180c and 180d, 186c and 186d, 188c and 188d, and 190c and 190d, to indicate the function status of the program select switch 178, eject switch 180, tape scan switch 186, tape Dolby switch 188, and power switch 190 when in the tape mode.

Associated with fast forward and normal forward selection switch 182 and fast reverse and normal reverse selection switch 184 are four pairs of red and green light-emitting diodes 182c–182f and 184c–184f. When in the tape mode, fast forward operation of the tape transport is indicated by energization of the green light-emitting diodes 182d and 182f of each of the two red/green pairs associated with switch 182. Simultaneously, the red light-emitting diodes 184c and 184e of each of the two red/green pairs associated with reverse switch 184 will be in the red light-emitting state. In the normal forward speed tape mode the green light-emitting diode 182d of the left red/green diode pair associated with switch 182 is energized while the red light-emitting diode 182e of the right red/green light-emitting pair is energized. Simulataneously, both red light-emitting diodes 184c and 184e of the two red/green light-emitting diode pairs associated with reverse switch 184 are energized.

When in the fast reverse mode, the red light-emitting diodes 182c and 182e of the forward switch 182 are energized, while both green light-emitting diodes 184d and 184f of the reverse switch 184 are energized. When in the normal reverse speed, the righthand green light-emitting diode 184f associated with switch 184 is energized, while the red light-emitting diode 184c associated with the lefthand pair of diodes of switch 184 is energized as are the red light-emitting diodes 182c and 182e of switch 182. Thus, by looking at the four red/green light-emitting diode pairs located below the switches 182 and 184, it is possible to determine, depending upon the color and location of the light-emitting diodes which are energized, whether the tape transport is in fast forward, normal forward, fast reverse, or normal reverse.

As is apparent, switches 150 and 158 are functional in both the tape and all radio modes. Switches 160–170 are functional in AM-FM modes only. Switches 174–190 are functional in both the AM-FM mode and the tape mode. The light-emitting diodes located above the switches 160–190 are functional only in the AM-FM mode, while the light-emitting diodes located below the switches 174–190 are functional only during the tape mode. Switch 172 is functional in the radio mode to select, on a sequential basis as the switch is sequentially activated, the AM or FM or CB radio mode.

The detachable user interface unit 18 also contains a stereo indicator 204 consisting of a red light-emitting diode and a green light-emitting diode. When in the FM radio mode, the green light-emitting diode will be energized to indicate reception of a stereo station, while the red light-emitting diode will be energized to indicate a monaural station. The input to the stereo indicator 204 is provided on line 206 output from the FM receiver 30.

To control the energization condition of the light-emitting diodes associated with switches 160–190, as well as the digital display 200, a conventional display demultiplexer, decoder and driver circuit 208 is provided in the detachable user interface unit 18. The circuit 208 converts serial binary information input thereto from the controller 37 on a serial data bus 210 into parallel data format in its demultiplexer section, decodes the parallel data in its decoder section, and inputs the decoded information to driver circuits for the light-emitting diodes associated with switches 160–190 and the digital display 200. Associated with the serial data bus 210 is a clock pulse input on line 214 from the controller 37 which facilitates clocking of the data to accomplish the demultiplexing and decoding operations.

To coordinate and control the operation of the various components of the audio system in response to activation of the various manual switches 160–190 and the cassette sensing switch 50A, as well as to provide the necessary input to the demultiplexer, decoder and driver circuit 208 to facilitate display of the status of the audio system, the suitably programmed microprocessor 37 is provided in association with the nonvolatile random access memory 37A. The random access memory 37A stores the condition of all dual position switches of the audio system, as well as the present AM and FM frequencies. The microprocessor is responsive to the output of the matrix 198 via lines 194 and 196, and in turn to the condition of dual position switches 160-190 associated with the matrix points thereof. Periodically, the microprocessor scans the matrix output lines 194 and 196 to determine the status of the switches 160-190 associated with the matrix points, and updates the status of the switch conditions stored in the nonvolatile random access memory 37A. If the status of one or more switches has changed since the previous scan, the microprocessor 37 executes the appropriate change in the status of the audio system dictated by the function of the switch which has been activated. As noted, the microprocessor 37 is also responsive to the output of the cassette sensor switch 50A on line 49, as well as the AM scan stop and FM scan stop signals on lines 82 and 84, and executes the appropriate functions in response to input signals on these lines.

Thus, the microprocessor 37 monitors the inputs to it, which have previously been described, and provides the appropriate outputs to the audio system components to execute the desired functions established by the status of the switches 160-190 and the cassette sensor switch 50A. In addition, the microprocessor provides the serial data and clock signals to the demultiplexer, decoder and driver circuit 208 via the serial data bus 210 and clock input line 214 to operate the light-emitting diodes associated with the switches 160-190 and the digital display 200 to reflect the status of the audio system. Since the microprocessor 37 itself forms no part of this invention, it is not further described.

The detachable user interface unit 18 includes a generally planar rectangular decorative trim panel 230 having the opening 192 for insertion and removal of cassette tapes into the tape deck 50 located in the chassis 10 in alignment with the opening 192. The trim panel 230 also includes an opening 200a in alignment with the digital display 200 which is located within user interface unit 18. The trim panel additionally has a plurality of slots 150'-158' and 160'-190' through which the slider switches 150-158 and the depressible dual position switches 160-190 project to facilitate manipulation by the user. The stereo indicator 204 is positioned behind the upper right corner portion of the opening 200a. The trim panel 230 further includes a plurality of indicia openings located above and below openings 172'-190' for the switches 172-190 which are illuminated from the rear by the light-emitting diodes associated with these switches. Indicia 172", 172''', and 172''''; 174" and 174'''; 176" and 176'''; 178" and 178'''; 182", 182''' and 182''''; 184", 184''', and 184''''; 186" and 186'''; 188" and 188'''; and 190" and 190''' are aligned with, and illuminated from behind by, light-emitting diodes 172a or 172b or 172c; 174a or 174b and 174c or 174d; 176a or 176b and 176c or 176d; 178a, 178b and 178c or 178d; 180a or 180b and 180c or 180d; 182a or 182b, 182c or 182d, and 182e or 182f; 184a or 184b, 184c or 184d, and 184e or 184f; 186a or 186b and 186c or 186d; 188a or 188b and 188c or 188d; and 190a or 190b and 190c or 190d; respectively. Similarly, the trim panel 230 has indicia slots 160", 162", 164", 166", 168", and 170" above the openings 160'-170' for the station preset switches 160-170 which are in alignment with, and illuminated from behind by, the light-emitting diodes 160a and 160b, 162a and 162b, 164a and 164b, 166a and 166b, 168a and 168b, and 170a and 170b associated with switches 160-170 to indicate the status thereof.

Located immediately behind the rear surface of the trim panel 230 is a reflector panel 232 which is provided with a plurality of bores 234 in which the switches 160-190 are located, as well as a plurality of funnel-shaped light reflecting tunnels 236 which each transmit light from one or the other of a pair of light-emitting diodes 238a and 238b located at the base 236a thereof to the appropriate trim panel switch-associated indicia opening which is located in alignment with the upper end 236b (as viewed in FIG. 3) of the reflector opening 236.

Figure 3:
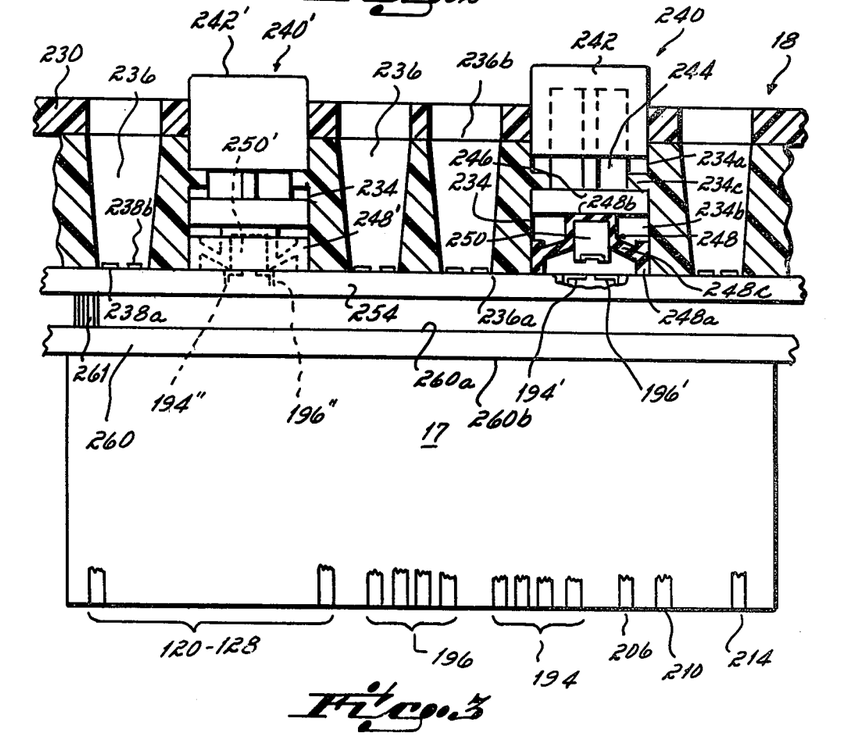
FIG. 3 is a horizontal cross-sectional view of the pluggable user interface unit.

For example, assuming the reflector tunnel 236 its aligned with trim panel opening 160" associated with the station preset switch 160, reflector opening 236 has at its bottom the red light-emitting diode 160a and the green light-emitting diode 160b which are alternatively energized in the AM-FM radio mode. The upper end 236b of the reflector tunnel 236 is located behind and in alignment with the indicia opening 160" in the trim panel 230 located above the trim panel switch opening 160' through which the switch 160 extends. If the audio system is in the AM or FM mode and the station preset switch 160 has not been activated, the red light-emitting diode 160a will be energized, providing a visually perceptible red indication in the trim plate indicia opening 160" associated with the switch 160, indicating that this switch has not been activated. If the switch 160 had been activated, the green light-emitting diode 160b would be energized, providing a visually perceptible green indication at its associated trim plate indicia opening 160b" located above the opening 160' through which switch 160 projects, indicating that this switch function has been activated. Thus, the light from the light-emitting diodes 160a and 160b, when energized, is projected to the trim plate indica 160" via the light reflecting tunnel 236 in panel 232 which is disposed between the light-emitting diodes 160a and 160b and the trim plate indicia opening 160" in the trim panel located above the trim plate switch opening 160' through which the switch 160 projects.

To enhance the transmission of light through reflector tunnels 236 from the light-emitting diodes to their respectively associated indicia openings in the trim panel 230, the walls 236 of the reflector tunnels 236 are preferably coated with a light-reflecting material or the reflector board 232 fabricated of material which reflects light.

Located within the switch bore 234 of the light reflector board 232 is a dual position switch 240 consisting of an upper cap 242 which projects through the associated switch opening (e.g., opening 160') in the trim panel 230, an intermediate plunger section 244 having a collar 246 of greater diameter, and a lower bell-shaped nonconductive resilient spring member 248, preferably fabricated of molded elastomer, which has secured to the central lower section a conductive graphite button 250. To permit assembly the cap 242 can be disassembled from the plunger 244. The bore 234 has upper and lower sections 234a and 234b of the same diameter which are separated by a shoulder 234c of reduced diameter which snugly embraces the plunger 244. The collar 246 and internal shoulder 234climit upward movement of the plunger 244. The bell-shaped resilient spring element 248 has its lower section 248a shaped in the form of an annulus which is snugly embraced by the lower internal wall of bore section 234b to limit radially outward movement of the annular section 248a of the spring member 248 when the cap 242 is depressed to activate the switch. The upper central portion 248b of the spring element 248 lies below and in contact with the lower surface of the collar section 246 of the plunger 244. Interconnecting the upper central and lower annular regions 248b and 248a, respectively, of the spring element 248 is a thin elastically deformable membrane 248c having the general shape of a truncated cone which elastically deforms when downward force is applied thereto via the plunger 244 when the cap 240 is depressed by the user to activate the switch.

Underlying the reflector board 232 is a printed circuit board 254 having mounted on its upper surface the various light-emitting diodes 238, as well as the groups of conductors 194 and 196 which are disposed in a matrix 198 such that the matrix points underlie different graphite buttons, such as button 250, of the switches 240 (160-190). When a particular one of the switches 240 (160-190) is in its normal undepressed condition shown in FIG. 3, the intersecting conductors from the conductor groups 194' and 196' at the matrix point underlying it are electrically disconnected. When the switch 240' is depressed by applying a downward force to button 242', elastically deforming the membrane 248c', the graphite button 250' bridges the pair of intersecting conductors from the groups 194" and 196" at the matrix point associated therewith, connecting them in an electrically conductive manner, thereby activating the associated switch function. When the button 242' is released, the spring element 248' returns to its normal shape, disconnecting the intersecting matrix conductors at the underlying matrix point.

In connection with the matrix 198, the conductors of groups 194 and 196 do not actually physically "intersect" at the matrix points, but rather are only sufficiently close together to permit electrical bridging thereof when their associated graphite button 250' contacts the "intersecting" conductors when the switch is activated. Thus, the term "intersect" is used in rather simplistic sense to conceptually describe the fact that the conductor groups 194 and 196 are arranged such that they function as a switch matrix.

The printed circuit board 254, in addition to mounting the light-emitting diodes 238 (160a-160b . . . 190a, 190b, 190c, 190d), as well as the stereo indicator 204 and the digital display 200, also has mounted on it the demultiplexer, decoder and driver circuit 208 which is input from the controller 37 with serial data on bus 210 and clock pulses on line 214.

Located below the printed circuit board 254 is a connector board 260 which on its upper surface 260a has projecting therefrom a plurality of pins 261, . . . , only some of which are shown, which make electrical contact at convenient locations on the printed circuit board 254 with the various light-emitting diodes and matrix conductors 194 and 196 as well as the stereo indicator 204 and demultiplexer, decoder and driver circuit 208. Extending from the lower surface 260b of the connector board 260 is the male tongue-shaped connector 17 having a plurality of conductors 120-128, 196, 194, 206, 210 and 212 thereon which connect via suitable printed circuit board patterns on surface 260b to the pins 261. The male connector 17 plugs into a suitable female connector 19 located in the front surface 10A of the chassis 10 for connecting the clock line 214, serial data bus 210, and matrix conductors 194 and 196 to the microprocessor 220; the stereo indicator line 206 to the FM circuit 30; and the slider switch output lines 120-128 to the audio processing circuit 112.

The microprocessor-based controller 37 can be any commercially available microprocessor suitably programmed in a well known and conventional manner to execute the various system functions described in response to activation of the switches provided on the interface unit 18. Accordingly, further description of the controller 18 is unnecessary.

Having described the invention, what is claimed is:

1. An audio system for use in a vehicle, comprising:
a digitally controllable audio signal source for providing audio signals from the output thereof,
visual display means responsive to d.c. display-controlling signals for controlling said display means to display the status of said audio system,
manually-operable switch means for generating d.c. input signals in response to manual activation of said switch means,
a microprocessor-based controller having an input responsive to said d.c. input signals from said switch means and an output electrically connected to the input of said audio signal source for providing digital control signals to control said audio signal source, said controller being operative to generate said d.c. display-controlling signals, as an incident to generation of said digital control signals, for controlling said display,
speaker means electrically connected to the output of said audio signal source to transduce audio signals output therefrom into audible sound,
mounting means for securely mounting said audio signal source and controller in a vehicle to resist removal thereof, and
quick-connect/disconnect means for readily releasably electrically connecting and disconnecting said switch means and visual display means to said controller while said audio signal source and controller remain securely mounted to said vehicle for facilitating, on an alternative basis, either (a) disablement of said audio system by disconnection and removal of said switch means and visual display means or (b) selective manual control of said audio signal source in response to manual activation of said switch means and display of the status of said audio system in response to d.c. display-controlling inputs thereto from said controller when said switch means and visual display means are connected, said quick-connect/disconnect means being disconnected from the output of said audio signal source to electrically isolate said audio signal source output from said manual switch means and display means when said switch means and display means are connected to said controller, thereby minimizing introduction of audio frequency interference into said audio signal source from said switch means and display means.

2. The system of claim 1 wherein said switch means includes a plurality of manually operable dual condition switches, and wherein said quick-connect/disconnect means includes a plurality of electrical conductors arranged in a matrix, with said plurality of manually operable switches being electrically connected to points of said matrix.

3. The system of claim 1 wherein said quick-connect/disconnect means further includes a serial data bus releasably interconnecting said controller and said display means, and wherein said display means includes serial-to-parallel data conversion means to facilitate control of said display means from serial data output from said controller via said serial data bus.

4. The system of claim 1 wherein said audio signal source includes a controllable audio signal processing means for selectively modifying said audio signals, said system further including at least one manually operable d.c. control means connectable to the input of said audio signal processing means for providing a d.c. control signal thereto for controlling said audio signal processing means, and quick-connect/disconnect means, operable in combination with said quick-connect/disconnect means of said display and manual switch means, for selectively electrically connecting and disconnecting said at least one manually operable d.c. control means to said audio signal processing means to facilitate control of said audio signal processing means by said at least one manually operable control means when said display means and manual switch means are connected to said controller.

5. The system of claim 1 wherein said secure mounting means includes a housing enclosing said audio signal source and controller and fastening means securely fastening said housing to said vehicle to resist removal thereof.

6. The system of claim 2 wherein said secure mounting means includes a housing enclosing said audio signal source and controller and fastening means securely fastening said housing to said vehicle to resist removal thereof, and wherein said quick connect/disconnect means includes an electrical plug connector element, said system further including a unitary user interface unit mounting said plug connector element, switch means, and display means to facilitate removal of said display and switch means and disconnection thereof from said controller by physical separation of said unitary user interface unit and said housing.

7. The system of claim 1 wherein said secure mounting means includes a housing enclosing said audio signal source and controller and fastening means securely fastening said housing to said vehicle to resist removal thereof, wherein said quick-connect/disconnect means includes an electrical plug connector element, and wherein said audio signal source includes a controllable audio processing means for selectively modifying said audio signals, said system further including at least one manually operable control means connected to the input of said audio processing means for providing a d.c. control signal thereto for controlling said audio processing means, and quick release means for selectively electrically connecting and disconnecting said at least one control means to said audio processing means to facilitate control thereof by said at least one manually operable control means, said system further including a unitary user interface unit mounting said plug connector element, switch means, display means and manual control means to facilitate removal of said display, switch means and manual control means and disconnection thereof from said controller and audio processing means by physical separation of said unitary user interface unit and said housing.

8. The system of claim 6 wherein said user interface unit includes:
a trim panel having access openings for said switch means,
said display means includes (a) plural light-emitting elements and (b) plural indicia on said trim panel associated with different access openings and illuminable from the rear thereof by said light-emitting elements,
a printed circuit board mounting said conductors in a matrix configuration and light-emitting elements,
a reflector panel mounted between said trim panel and printed circuit board, said reflector panel having reflector tunnels in register with said light-emitting elements and said indicia to facilitate illumination of said indicia from the rear thereof by said light-emitting elements, and
said switch means extending through said reflector panel in register with points of said conductor matrix on said printed circuit board, said switch means being accessible through said trim panel access openings to facilitate activation thereof.

9. The system of claim 8 wherein at least two light-emitting elements having different light-emitting characteristics are aligned with a single tunnel, said different light-emitting elements being energized alternatively to illuminate a single indicia associated with said single tunnel on an alternative basis to provide different visual effects with said single indicia.

10. The system of claim 6 further including a panel securely mounted to said vehicle, said panel having an opening therein through which said plug element projects when said user interface unit and controller are plugged to connect said controller to said switch means and display means, said housing being configured relative to said opening to prevent removal of said housing through said opening, said interface unit and housing being disposed on opposite sides of said panel when said user interface unit and said controller are connected by said plug element.

11. A user interface unit for an audio system having speakers and a housing securely mounted to a vehicle containing an audio signal source and a controller, comprising:
visual display means responsive to d.c. display-controlling signals for controlling said display means to display the status of said audio system,
manually-operable switch means for generating d.c. input signals in response to manual activation of said switch means,
quick-connect/disconnect means for readily releasably electrically connecting and disconnecting said switch means and visual display means to said controller while said housing remains securely mounted to said vehicle for facilitating, on an alternative basis; either (a) disablement of said audio system by disconnection and removal of said switch means and visual display means or (b) selective manual control of said audio signal source in response to manual activation of said switch means and display of the status of said audio system in response to d.c. display-controlling inputs thereto from said controller when said switch means and visual display means are connected, said quick-connect/disconnect means being disconnected from the output of said audio signal source to isolate said audio signal source output from said manual switch means and display means, when said switch means and display means are connected to said controller, thereby minimizing introduction of audio frequency interference into said audio signal source from said switch means and display means, a trim panel having access openings for said switch means, said display means includes (a) plural light-emitting elements and (b) plural indicia on said trim panel associated with different access openings and illuminable from the rear thereof by said light-emitting elements, a printed circuit board mounting said conductors in a matrix configuration and light-emitting elements, a reflector panel mounted between said trim panel and printed circuit board, said reflector panel having reflector tunnels in register with said light-emitting elements and said indicia to facilitate illumination of said indicia from the rear thereof by said light-emitting elements, and said switch means extending through said reflector panel in register with points of said conductor matrix on said printed circuit board, said switch means being accessible through said trim panel access openings to facilitate activation thereof.

12. The user interface unit of claim 11 wherein at least two light-emitting elements having different light-emitting characteristics are aligned with a single tunnel, said different light-emitting elements being energized alternatively to illuminate a single indicia associated with said single tunnel on an alternative basis to provide different visual effects with said single indicia.

13. The user interface unit of claim 11 wherein said reflector panel includes bores through which extend said manually-operable switch means, said switch means including an integral nonconductive member having:

an annular section snugly embraced by said bore proximate a matrix point of said printed circuit board, a cylindrical section containing an electrical contact, said cylindrical section being sized to fit within said annular section to electrically bridge conductors at a matrix point proximate thereto, an intermediate elastically deformable section of generally frusto conical shape interconnecting said cylindrical and annular sections to normally maintain said cylindrical and annular sections spaced apart and said contact in non-bridging relation to said conductors at said matrix point, said intermediate section elastically deforming when a force is applied to said cylindrical section in a direction to urge it into said annular section and enable said contact to bridge said conductors at said matrix point, said intermediate section returning to its nondeformed shape when said force is removed to restore said cylindrical section to its normal position spaced apart from said annular section.

* * * * *

UNITED STATES PATENT AND TRADEMARK OFFICE
CERTIFICATE OF CORRECTION

PATENT NO. : 4,481,512
DATED : November 6, 1984
INVENTOR(S) : Fred L. Tscheulin et al It is certified that error appears in the above-identified patent and that said Letters Patent is hereby corrected as shown below:

Col. 6, line 37, "stero"         should be -- stereo --.

Col. 6, line 47, "stero"         should be -- stereo --.

Col. 6, line 50, "auido"         should be -- audio --.

Col. 7, line 9, "form"           should be -- from --.

Col. 7, line 23, "providd"       should be -- provided --.

Col. 7, line 28, "trebble"       should be -- treble --.

Col. 7, line 30, "fuction"       should be -- function --.

Col. 8, line 24, "recevier"      should be -- receiver --.

Col. 8, line 35, after "phase", insert -- locked --.

Col. 10, line 8, "simulataneously" should be -- simultaneously --.

Col. 11, line 4, "present"       should be -- preset --.

Col. 12, line 15, "its"          should be -- is --.

Col. 12, line 38, "indica" should read -- indicia opening --.

UNITED STATES PATENT AND TRADEMARK OFFICE
CERTIFICATE OF CORRECTION

PATENT NO. : 4,481,512

DATED : November 6, 1984

INVENTOR(S) : Fred L. Tscheulin et al

Page 2 of 2

It is certified that error appears in the above-identified patent and that said Letters Patent is hereby corrected as shown below:

Col. 12, line 65, insert a space between "234c" and "limit".

Col. 13, line 41, after "in", insert -- a --.

Signed and Sealed this

Twenty-third Day of April 1985

[SEAL]

Attest:

DONALD J. QUIGG

Attesting Officer

Acting Commissioner of Patents and Trademarks